United States Patent [19]

Cabrera et al.

[11] Patent Number: 5,071,450
[45] Date of Patent: Dec. 10, 1991

[54] MODIFIED CARBON MOLECULAR SIEVE ADSORBENTS

[75] Inventors: Alejandro L. Cabrera, Fogelsville; John N. Armor, Orefield, both of Pa.

[73] Assignee: Air Products and Chemicals, Inc., Allentown, Pa.

[21] Appl. No.: 583,067

[22] Filed: Sep. 14, 1990

[51] Int. Cl.$^5$ .................... B01D 53/04; B01J 20/02
[52] U.S. Cl. .................................. 55/66; 55/68; 55/75; 55/389; 502/417; 502/432; 502/437
[58] Field of Search ............ 55/66, 68, 74, 75, 389; 502/417, 430, 432, 437

[56] References Cited

U.S. PATENT DOCUMENTS

| | | | |
|---|---|---|---|
| 3,801,513 | 4/1974 | Munzner et al. | 252/421 |
| 4,458,022 | 7/1984 | Ohsaki et al. | 502/42 |
| 4,526,887 | 7/1985 | Sutt, Jr. | 55/75 X |
| 4,528,281 | 7/1985 | Sutt, Jr. | 55/75 X |
| 4,594,163 | 6/1986 | Sutt, Jr. | 55/75 X |
| 4,734,394 | 3/1988 | Koasaka et al. | 55/75 X |
| 4,790,859 | 12/1988 | Marumo et al. | 55/75 X |
| 4,820,681 | 4/1989 | Chang et al. | 55/75 X |
| 4,880,765 | 11/1989 | Knoblauch et al. | 55/75 X |
| 4,902,312 | 2/1990 | Chang | 55/75 X |
| 4,925,461 | 5/1990 | Gemba et al. | 55/75 X |
| 4,933,314 | 6/1990 | Marumo et al. | 55/75 X |

FOREIGN PATENT DOCUMENTS

| | | | |
|---|---|---|---|
| 2045200 | 3/1972 | Fed. Rep. of Germany | 55/75 |
| 49-37036 | 10/1974 | Japan | |
| 62-176908 | 8/1987 | Japan | |
| 1022725 | 6/1983 | U.S.S.R. | 55/75 |

OTHER PUBLICATIONS

P. L. Walker, Jr., "Molecular Sieves", Mineral Industries, Jan. 1966.
Y. Nakano et al., "Control of Micropores of Molecular Sieving Carbon by Impregnation of Hydrocarbons and Heat Treatment", 20th Spring Chemical Industrial Convention of Himeji, Oct. (1987).
R. Chihara, "Air Separation By Modified Molecular Sieving Carbon", Proc. Third Pacific Chem. Org. Congress, vol. 1 (1983).
S. I. Surinova, "Formation of the Porous Structure of Carbon Molecular Sieves from Caking Coals", Khim. Teord. Top, Moscow (5) 86-90 (1988).
W. P. Hoffman, et al., "Pyrolysis of Propylene Over Carbon Active Sites II. Pyrolysis Products", Carbon, vol. 26, No. 4, pp. 485–499 (1988).

Primary Examiner—Robert Spitzer
Attorney, Agent, or Firm—Mark L. Rodgers; William F. Marsh; James C. Simmons

[57] ABSTRACT

A process is provided for making a modified carbon molecular sieve which is suitable for separating gases having different adsorption rates on the sieve. The process involves modifying a starting sieve support having a majority of micropores with an effective pore size of about 4.5 to 20 angstroms, with a two-step process in which the sieve is contacted with two diffrent concentrations of a volatile carbon-containing organic compound, preferably a hydrocarbon. The concentration of the carbon-containing compound used in the first step is larger than that in the second step, so that the pore openings of the micropores of the support are narrowed successively in two distinct steps without filling the micropores themselves. The invention also discloses an improved carbon molecular sieve and the separation of gases, such as oxygen from nitrogen, by the use of this improved absorbent.

12 Claims, 2 Drawing Sheets

MODIFIED CARBON MOLECULAR SIEVE ADSORBENTS

FIELD OF INVENTION

This invention relates to a process for modifying a carbon molecular sieve adsorbent to enhance its utility for gas separation by depositing carbon on the adsorbent in order to change the effective diameter of its micropore openings. In another aspect it relates to the modified carbon molecular sieve adsorbents which are produced by this process. Still another aspect of the invention relates to the separation of gases using these modified carbon molecular sieve adsorbents.

BACKGROUND OF INVENTION

The use of carbon molecular sieves to separate various materials has been known for several decades. Walker in "Molecular Sieves" *Mineral Industries* (January 1966) discloses obtaining carbon molecular sieves by charring polyvinylidine chloride and vinyl chloride-vinylidine chloride copolymer. These chars are said to have large micropores and are useful for the separation of hydrocarbons. The sieves can be modified by combining the char with a thermosetting furan resin or lignite pitch and carbonizing the product.

U.S. Pat. No. 3,801,513, Munzner, et al., (1974) states that it was not known that carbon molecular sieves (CMS) could be suitable for the separation of oxygen and nitrogen. This reference describes obtaining CMS for oxygen separation by treating coke having volatile components of up to 5% with a carbonaceous substance which splits off carbon at 600° to 900° C., thereby narrowing the pores present in the coke. It is stated that the average pore size of the adsorbent must be below 3 angstroms to effect oxygen separation from nitrogen. The average pore diameter can be adjusted by changing the intensity of the treatment. Coconut shell coke is a suitable starting material, among others. A preference is stated for a particle size in the range of 0.1 to 20 millimeters and suitable carbonaceous substances which can be used in the treatment include benzene, ethylene, ethane, hexane, cyclohexane, methanol, and the like. It is stated that if coking is carried with pitch, bitumin, tar or tar oil, gaseous coking materials are formed in the heat treatment and this atmosphere can be adjusted to exert the desired effect. In this way, introduction of at least part of the carbonaceous substance is avoided, but addition of the carbonaceous substance can modify the coke to increase its separating capacity.

Japanese Publication No. Sho 49-37036 (1974) describes making a carbon molecular sieve by condensing or polymerizing a phenol resin or furan resin so that the resin is adsorbed on a carbon adsorbent and thereafter carbonizing the product by heating. Mixtures of the resins can also be used. The resin forming material is dissolved in water, methanol, benzene or creosote oil and the solution is used to impregnate the carbon adsorbent. Carbonizing can be carried out at 400° to 1,000° C. in an inert gas. This operation is said to reduce the pore diameter of the carbon adsorbent.

Nakano et al., "Control of Micropores of Molecular Sieving Carbon by Impregnation of Hydrocarbons and Heat Treatment", presented at the 20th Spring Chemical-Industrial Convention at Hirneji, October (1987) describe modification of molecular sieving carbon having micropores less than 5 angstroms in diameter by impregnation with hydrocarbon mixtures and thereafter heat treating at 750° to 950° C. in order to control micropore diameter to 2.8 to 4 angstroms and make the CMS suitable for separating oxygen and nitrogen. Granulated carbon was formed from coal tar or coal tar pitch and coconut char. The liquid hydrocarbons used for impregnating the carbon were mixtures of napthalene with coal tar, diphenyl or fluorene in various concentrations from 5 to 50 wt. %. Fluorene was found to have the greatest effect on oxygen and nitrogen adsorption rates.

Chihara et al., Proc. Third Pacific Chem. Eng. Congress, Vol. 1 (1983) discloses that CMS which is a pelletized granular activated carbon can be treated by thermally decomposing benzene in a fluidized bed of the CMS to deposit carbon thereon and thereby adjust the overall mass transfer coefficients of oxygen and nitrogen in the CMS. A nitrogen product gas of 99.5% purity was obtained by pressure swing adsorption. A constant adsorption capacity was interpreted as indicating carbon deposition at the mouth of the micropore.

U.S. Pat. No. 4,458,022, Ohsaki et al., (1984) refers to several prior art processes for narrowing the micropores of active carbon by precipitating soot in the micropores and describes a method said to provide improved selectivity for separating nitrogen from air. The method involved using coconut shell charcoal and coal tar binder, acid washing, adding coal tar and heating to 950° to 1,000° C. for 10 to 60 minutes. The coal tar is said to penetrate into the surface of the active carbon and decompose to grow carbon crystallite on the inner surface of the micropore. It is stated that for PSA separation of nitrogen and oxygen, the oxygen adsorption capacity should be more than 5 milliliters per gram and the selectivity more than 22 to 23.

Japanese Patent Application No. Sho 62-176908 (1987) discloses a method for making carbon molecular sieves suitable for separating oxygen and nitrogen involving the use of carbon from coconut shells and coal tar or coal tar pitch binder to form particles which are dry distilled at 600° to 900° C., washed with mineral acid and water and dried, and then impregnated with creosote, 2,3-dimethylnapthalene, 2,4-xylenol or quinoline and heat treated for 10 to 60 minutes at 600° to 900° C. in inert gas. Both oxygen adsorption rate and selectivity are said to be improved and the procedure is said to be superior to the use of hydrocarbons, such as benzene, pyrolyzed in the gas phase so that carbon produced adheres to the carbonaceous surface.

Surinova, Khim. Tevrd. Top., Moscow (5) 86-90 (1988) describes obtaining carbon molecular sieves for concentration of nitrogen from air by carbonizing coals using benzene vapor and inert gas. The treatment had no effect on macropores but the pyrocarbon formed on decomposition of benzene is said to block the micropore inlets. Although this reference contains some recognition of the relationship between the hydrocarbon size and the pore size of the carbon, the work was apparently unsuccessful in reducing the concept to practice on coal samples whose capacity had been increased by oxidative treatment.

Hoffman, et al., "Pyrolysis of Propylene Over Carbon Active Sites II. Pyrolysis Products", *Carbon* Vol. 26, No. 4, pages 485–499 (1988) describe depositing carbon on graphitized carbon black by thermal decomposition of propylene, recognizing that propylene is excluded from some of the carbon sites. Both oxidized and unoxidized carbon samples were studied.

None of the above references describe a procedure which is suitable for modifying carbon molecular sieves which have a large population of relatively small micropores, on the order of 4.5 to 8 angstroms, but are still too large for effective separation of gases such as oxygen and nitrogen. In order to be effective for air separation by pressure swing adsorption (PSA) the adsorbent must not only exhibit good selectivity as suggested by the '022 patent, but must also have a high adsorbing capacity and permit high rates of gas throughput. While it is known that CMS having micropores on the order of ~4 angstroms can be used successfully for this purpose, these adsorbents are very expensive and it is highly desirable to find a method of modifying a less expensive CMS, such as one having a characteristic pore size of about 5 angstroms, by a simple straight-forward procedure.

Although air separation can be effected over carbon molecular sieve adsorbents (CMS's), these adsorbents separate oxygen from air on a kinetic basis, sorbing the smaller oxygen molecules rapidly relative to the slightly larger nitrogen molecules. In order to effect separation the adsorbent must have pore openings of about the molecular diameter of the larger gas in the mixture (nitrogen in air). This allows for rapid adsorption of the smaller component and slower diffusion of the larger component, resulting in high kinetic selectivity. The ability to control the size of the pore openings on a CMS to exacting specifications, to tenths of an angstrom in the case of air separation, is a major challenge for preparing CMS adsorbents. Improved CMS adsorbents are needed to reduce the cost of air separation by pressure swing adsorption (PSA) systems since the adsorbent is a key part of the performance of the entire process unit.

SUMMARY OF THE INVENTION

He have found that kinetically oxygen-selective adsorbents can be prepared from a variety of porous carbons by forming a carbonaceous surface layer on a carbon support in a particular manner. Selective pyrolysis of a molecule that is too large to penetrate the micropores of the carbon support produces microporous domains of carbon which have high kinetic selectivity for oxygen relative to nitrogen owing to the deposition of carbonaceous residue at the pore mouth openings. We have identified a two step method of promoting surface barrier formation via pyrolysis of a volatile carbon-containing organic compound, preferably a hydrocarbon. First, the average pores diameter is reduced by carbon deposition from cracking the carbon-containing organic compound in a concentration of from about 15 to 75%, and preferably from about 20 to 50%, by volume in an inert gas, inside the pores of the carbon support. This cracking is carried out until most, but not all of the micropores are narrowed to about 4.0 Å. Subsequently a lower concentration (i.e., from about 1 to 10% in an inert gas) of the organic compound is cracked on the intermediate product at the entrance of the micropores. This effectively increases the working selectivity of the intermediate product (that had only undergone the initial treatment) by a factor of about 2, with a much smaller loss in $O_2$ adsorption rate. In contrast, prolonged coking with a single concentration of organic compound causes adsorption rates to decrease faster than selectivity increases. The present procedure has been found to impart $O_2$ selectivity to carbons with pores too large to be effectively modified by existing technology.

According to our invention a process is provided for making a modified carbon molecular sieve adsorbent which is suitable for separating gases which have differing molecular dimensions that effect their adsorption rates. This modification is carried out by treating a starting carbon molecular sieve support which can be characterized as having a majority of its micropores with a nominal size in the range of about 4.5 to 20 angstroms. The modification procedure involves: (a) contacting the starting carbon molecular sieve support under pyrolysis conditions with a volatile carbon-containing organic compound at a concentration of about 15 to 75% in an inert gas, for a time sufficient to reduce the average pores diameter by carbon deposition from hydrocarbon cracking occurring inside the pores, thereby forming an intermediate carbon molecular sieve, having narrowed pores and thereafter (b) contacting this intermediate carbon molecular sieve under pyrolysis conditions with the same carbon-containing compound, but in a concentration of 1 to 10% in an inert gas to cause carbon deposition at the entrance of the pores. The molecular dimension of the carbon-containing compound should be smaller than the majority the pore openings (but typically larger than 5 Å) in the untreated support, but large enough to preclude penetration of most of the micropores remaining in the intermediate carbon molecular sieve.

This invention also provides a novel modified carbon molecular sieve which has its micropore openings narrowed by the deposition of carbon in two distinct steps involving two different concentrations of the carbon-containing compound which decomposes to provide the carbon deposition.

The invention also includes the separation of gases by selective adsorption using the improved modified carbon molecular sieve of the invention.

DETAILED DESCRIPTION OF THE INVENTION

Figure 1:
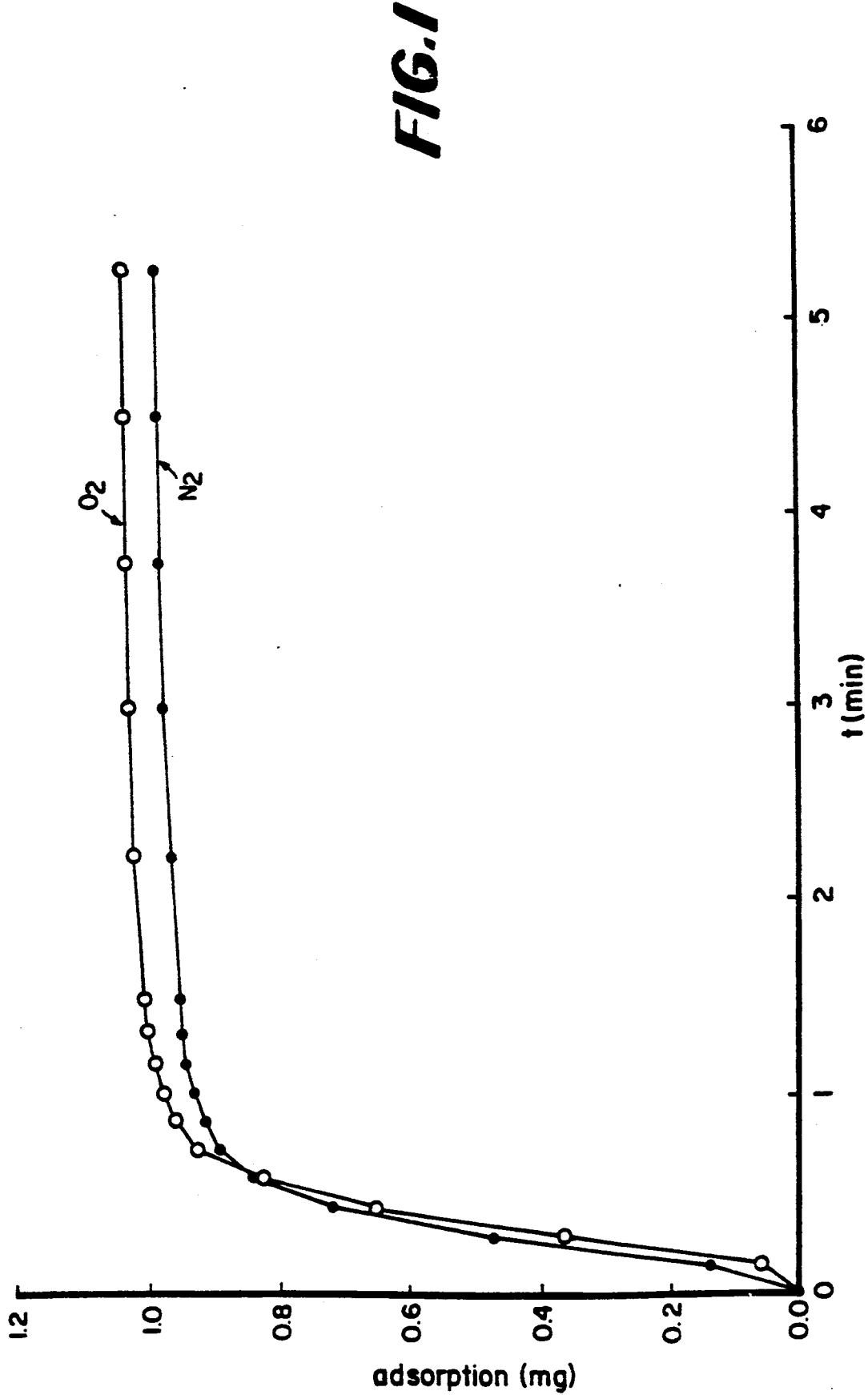
FIGS. 1 and 2 are graphs showing oxygen and nitrogen adsorption for untreated activated carbon from coconut shell and for the same type carbon which has undergone the two-step treatment of the present invention, respectively.

Kinetic selectivity can be imparted to microporous carbons by pyrolyzing a reagent that will leave carbonaceous residue on the carbon substrate. It is known that pyrolysis of a carbonaceous substance on select coal samples imparts kinetic oxygen selectivity (U.S. Pat. No. 3,801,513). Other methods of imparting kinetic oxygen selectivity include treating coconut shell derived microporous carbons with coal tar pitch (U.S. Pat. No. 4,458,022), creosote, 2,3-dimethylnapthalene, 2,4-xylenol, or quinoline (Sho 62-176908), and treatment of carbon derived from furan or phenol resins with phenols, aldehydes, or furfuryl alcohol (Sho 49-37036). In each of these cases, the pore properties of the carbon substrate are critically important to the success of the treatment in imparting oxygen selectivity to the product. We have found that the carbon source must be comprised of pores of about 4 Å for these prior art treatments to impart fast kinetic oxygen selectivity over nitrogen. In addition, the granular or pelleted material must contain a sufficient number of transport pores (~0.1-1.0 μm) to assure rapid transport of the $O_2$ and $N_2$ to the size selective micropores.

All molecular sizes refer to those typically described as minimum Van der Waals diameters. Here $O_2$ is 2.8 Å in width while $N_2$ is 3.0 Å. This contrasts to the Leonard Jones a value where the width of $O_2$ is 3.46 Å and $N_2$ is 3.64 Å (Ref: D. H. Breck, "Zeolite Molecular Sieves," *Wiley-Interscience.* N.Y., N.Y., p. 636). In principal, however, the pores must be somewhat larger than the minimum critical dimensions of the diffusing molecule due to additional energy barriers (e.g., interaction of $\pi$ electron density, etc., with the walls of slit shaped pores; Ref: M. B. Rao, et al. *Langmuir,* 1, 137 (1985)). Thus, we observe pores for distinguishing $O_2$ from $N_2$ should be >3.8, but <4.3 Å.

The two step pyrolysis treatment allows a uniform narrowing of pore-mouth openings having an effective size in the range of about 4.5 to 20, preferably 4.5 to 6, angstroms to about 4.0 Å. This treatment is superior to any single step treatment, since it allows a very high percentage of the pore openings to be narrowed such that they become kinetically selective for oxygen adsorption relative to nitrogen, without becoming so narrow that adsorption becomes slow, or the pores become blocked.

While not to be bound by theory, it is believed that this two step process is effective because when a hydrocarbon is cracked in the pores of the carbon, the micropores are narrowed to the point that they discriminate between $O_2$ and $N_2$ by size. Continued coking with a hydrocarbon in large concentration narrows all of the pores, resulting in closure of some pores (to <3.8 angstroms) by the time the larger pores are narrowed to 3.8-4.0 angstroms. The use of a lower concentration of the hydrocarbon and lower pyrolysis temperature in a discreet second step allows carbon to be deposited at the entrance of the pore mouths. This occurs due to the smaller concentration of hydrocarbon's ability to penetrate 4.0-4.3 angstrom pores and crack in the pore mouth entrances, and their inability to penetrate pores smaller than 4.0 angstroms.

Simultaneous cracking of a large and small hydrocarbon at various concentrations is ineffective and results in low capacity adsorbents with slow adsorption rates. To impart fast kinetics and oxygen selectivity to pores with 5 Å-6 Å openings, it is essential that a two-step treatment with the hydrocarbon is used and in order of decreasing concentration and temperature.

The starting carbon molecular sieve support can be any CMS having micropores, which are generally considered to have a size less than 20 angstroms, and in which a majority of the micropores have sizes which are greater than 3.4 angstroms. In order to gain the advantages of this invention, the micropores should have a size of at least 4.5 angstroms, since if the size of the micropores is below this figure, modification to improve oxygen/nitrogen selectivity can be achieved in a single step carbon deposition process and the starting CMS support will be a much more expensive and therefore of less advantage to modify then those CMS supports in the 4.5 to 20 angstrom range of characteristic pore size. Coconut shell carbon is one suitable source for supports which can be used to advantage in this invention.

The treating compound which supplies the carbon for narrowing the pore diameter of the support can be any volatile carbon-containing organic molecule, including hydrocarbon and compounds with hetero atoms such as oxygen, nitrogen, sulfur, silicon and the like, provided that the compound can decompose cleanly without forming pore-plugging materials. It is important, however, for the carbon-containing compound which is used to have a molecular dimension smaller than the majority of the pore openings in the untreated carbon support and large enough to preclude penetration of most of the micropores after the first step. While this dimension cannot be measured from a molecular model of the compound because of other inhibiting effects which control the ability of the molecule to enter the micropores of the adsorbate, the dimension can be determined empirically by calibration with a CMS of known pore dimensions as determined by a plug gauge method. A compound which is useful in this treating method is isobutylene and other compounds, preferably hydrocarbons, having similar minimum molecular dimensions (MED).

The conditions of pyrolysis are different in that generally the first step is carried out at temperatures at or above 700° C. and typically at temperatures in the range of 700° to 900° C., whereas the second step is carried out at temperatures below 700° C., and typically between 700° to 550° C. The pressure at which both steps are carried out are pressures under which the treating carbon containing compound is gaseous, preferably about 0.05 to 0.2 atm at a total pressure of 1 atmosphere. The flow rates of the treating material as well as temperatures can be adjusted along with the duration of the treating step in order to modify the effects desired. In general, a lower flow rate produces more severe conditions as do longer times and higher temperatures. These factors are interdependent and can be balanced against each other but are also affected by the amount of the carbon-containing compound, the size of the reactor, its configuration, preheating and volatility of the organic compound. If the organic compound is normally a liquid, it can readily be vaporized in an inert carrier gas, and gaseous treating compounds are diluted with inert gases.

In order to illustrate our invention more fully, the following examples are presented which should not be construed to limit our invention unduly.

EXPERIMENTAL

Adsorption measurements for the following examples for different carbon materials were carried out in a Cahn 2000 microbalance at room temperature. Weight uptake curves were obtained for the carbon samples before and after modification. Pellet samples weighing about 150 mg were suspended from the microbalance using a quartz basket. The samples were then exposed to 100 cc/min He flow and after a stable baseline was obtained the gas was switched to $O_2$ or $N_2$. The weight uptake curve due to the gas adsorption was recorded until no more weight increase was observed. Baseline corrections due to changes in viscosity and buoyancy were also recorded using an empty quartz basket.

The $O_2$ and $N_2$ adsorption curves were fitted with an exponential-type of curve of the form:

$$W(t) = W\alpha(1-\exp(-K(O_2)t))$$

where $W\alpha$ is the saturation value at full loading and $K(O_2)$ is the effective mass transfer coefficient for $O_2$. The effective mass transfer coefficient is proportional to the diffusion constant. Therefore, the ratio of this coefficient for $O_2$ and $N_2$ is equal to the ratio of $O_2$ and $N_2$ diffusion constants yielding a selectivity value for the material. The two step pyrolysis treatment was also carried out in the same microbalance. Modification of the carbon substrate was monitored by measuring the amount of carbon deposited as weight uptake in mg.

EXAMPLES 1-5

Pellets from Takeda (Takeda CSM-5A) having an average micropores diameter of 0.45 nm and which are unselective for $O_2$ adsorption, i.e., $N_2$ adsorption occurs as fast as $O_2$ adsorption, were treated with isobutylene in accordance with the present invention under various conditions. Oxygen and nitrogen adsorption measurements were carried out as described above for the treated pellets. For comparison, oxygen and nitrogen measurements were also carried out for a one-step treatment CSM-5A adsorbent (Example 2). The treatment conditions as well as the results for all of these runs are set out in Table 1 below.

TABLE 1

| | First Step 20% Isobutylene | | | | Second Step 5% Isobutylene | | | | |
|---|---|---|---|---|---|---|---|---|---|
| Example | T (°C.)$^a$ | Carbon$^b$ Deposit Wt (mg) | $K(O_2)^c$ l/min | Sel$^d$ | Cap$^e$ cc/g | T (°C.)$^a$ | Carbon$^b$ Deposit Wt (mg) | $K(O_2)^c$ l/min | Sel$^d$ | Cap$^e$ cc/g |
| 1 | 700 | 5.8 11 min | 1.57 | 10 | 7.6 | 650 | 0.2 1.0 h | 0.64 | 21 | 8.3 |
| 2 | — | — | — | — | | 650 | 4.8 2.2 h | 1.31 | 10 | 7.8 |
| 3 | 700 | 3.0 3 min | — | 1 | | 650 | 2.9 1.9 h | 0.95 | 16 | 8.1 |
| 4 | 700 | 3.0 3 min | — | 1 | | 650 | 2.1 1.0 h | 2.47 | 6 | — |
| 5 | 700 | 2.0 1.5 min | — | 1 | | 650 | 3.2 1.9 h | 1.23 | 11 | 8.4 |

Note: Initial capacity of nonselective carbon host is 8.8 cc/g.
$^a$Treatment temperature.
$^b$Weight uptake due to carbon deposition during treatment. This weight increase was measured for 150 mg of carbon host. Deposition time, in minutes, is indicated below the weight uptake entry for each example.
$^c$Mass transfer coefficient for $O_2$ from curve fit to $W(t) = Wa(1-\exp(K(O_2) \cdot t)$ for $O_2$ adsorption.
$^d$Selectivity for $O_2$ over $N_2$ derived from mass transfer coefficient ratios ($K(O_2)/K(N_2)$).
$^e$Gas capacity (Wa) of carbon adsorbent after treatment obtained from equilibrium value of $O_2$ adsorption at 1 atm and about 25° C.

From the results reported in Table 1 above, it can be seen that the two-step carbon deposition process of the present invention can yield adsorbents with both high selectivity and high capacity. By using a one step treatment, such as in Example 2, the selectivity was not able to be increased beyond 10 because carbon deposition occurs extremely slowly after 2 h treatment or about 4.8 mg at 650° C.

EXAMPLE 6

The two-step carbon deposition process of the present invention was carried out on a commercial activated carbon from coconut shell obtained from Sutcliffe Speakman as 203 C. This adsorbent has an average pore diameter larger than 0.7 nm and is unselective for oxygen and nitrogen. It has a total pore volume of 0.56 cc/g with a Hg pore volume of 0.35 cc/g, a micropore volume of 0.2 cc/g, an $O_2$ capacity of 7.4 cc/g, a Hg pellet density of 0.92 g/cc and a volumetric capacity of 6.8 cc/cc. Plug gauge studies indicate a substantial microporosity exists between 6-40 Å. The coconut shell carbon 203 C was treated with 20% isobutylene in nitrogen at 700° C. until 3 mg of carbon was deposited. A second carbon deposition step was carried out with 5% isobutylene in nitrogen at 650° C. to deposit 3 more mg of carbon. $O_2$ and $N_2$ gravimetric adsorption testing was carried out in accordance with the procedures set out above. The test indicated that an $O_2$ selectivity of 6 was imparted to the carbon, $K(O_2)$ was still reasonably fast (1.140 l/min) and the capacity decreased from 7.6 to 6.0 cc/g.

Figure 2:
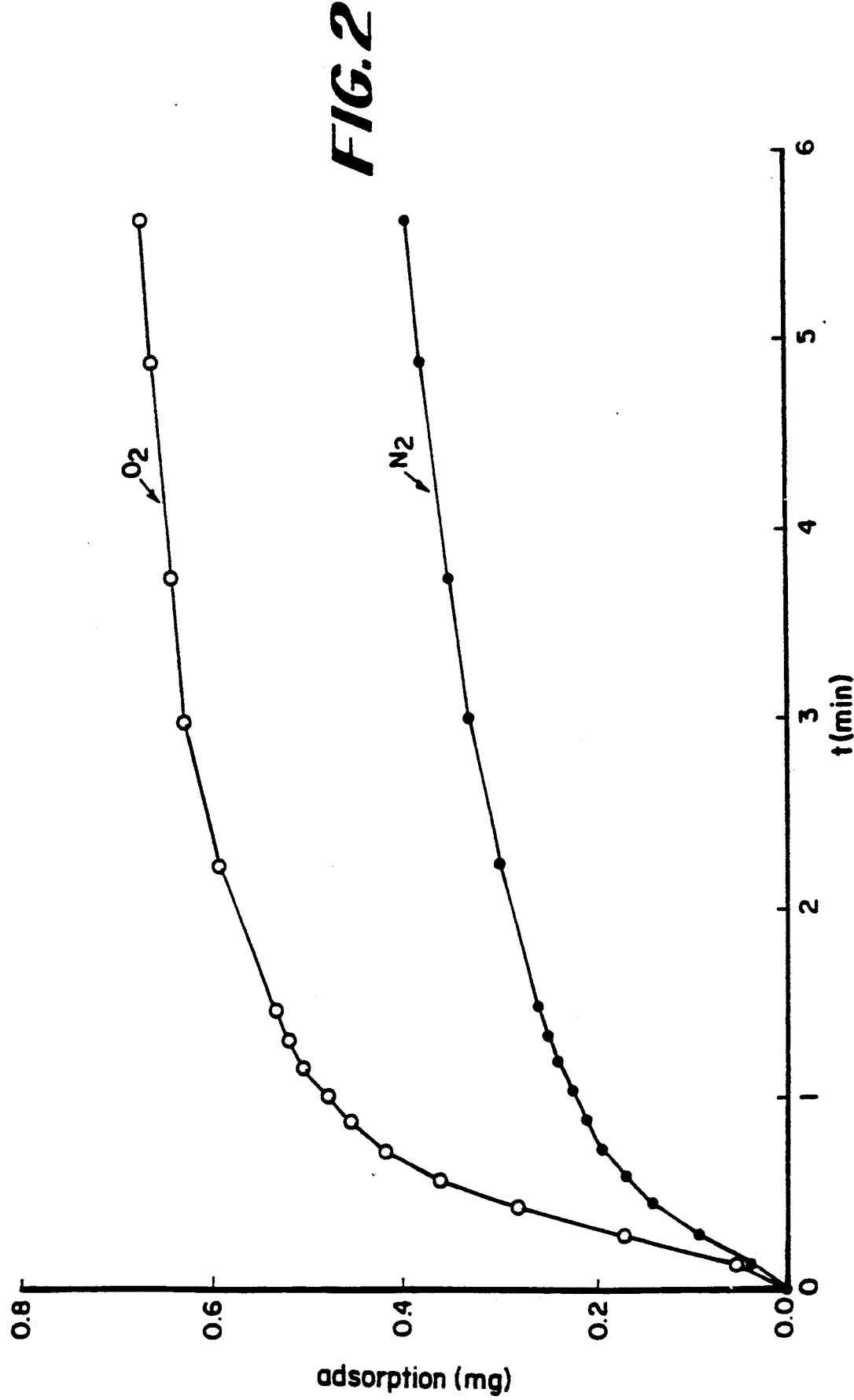

The graphs of FIGS. 1 and 2 show the $O_2$ and $N_2$ adsorption curves for untreated 203 C and 203 C treated as described above, respectively. The graphs clearly indicate a significant increase in $O_2/N_2$ selectivity for the treated adsorbent (i.e., the difference between $O_2$ and $N_2$ adsorption).

Additionally, it was found that selectivity could not be increased to any significant degree for the 203 C adsorbent by a one step carbon deposition treatment.

With such fine pore size control, these materials produced by this two step procedure would also be appropriate for separating other gas mixtures such as $O_2$/argon (since argon is slightly larger than $N_2$, the same material would be useful for separating $O_2$/argon as well as $O_2/N_2$.) By altering the two step deposition procedure to produce slightly different, but precisely controlled pore sizes and pore distributions, one should also be able to separate other mixtures such as $CO_2/N_2$, $H_2/CH_4$, or $N_2/H_2$ using pores sized to slightly different sizes.

Through proper choice of hydrocarbon, cracking volatile carbon-containing organic compounds using a two step process employing a higher concentration of the compound followed by a lower concentration of the same compound allows one to turn inexpensive nonselective carbons into high value oxygen selective adsorbents.

Other advantages and embodiments of our invention will be apparent to those skilled in the art from the foregoing disclosure without departing from the spirit or scope of the invention.

We claim:

1. A process for making a modified carbon molecular sieve adsorbent, suitable for the separation of gases having differing molecular dimensions which affect their adsorption rates, by treating a starting carbon molecular sieve support characterized by a majority of its micropores having a nominal size in the range of about 4.5 to 20 Å which comprises:
   (a) contacting said starting support under pyrolysis conditions, including a temperature of 700° C. or greater, with a volatile carbon-containing organic compound having a molecular dimension which allows penetration of said micropores of about 4.5 to 20 Å, in a concentration of from about 15 to 75% by volume in an inert gas, thereby forming an intermediate carbon molecular sieve having narrowed pores, and (b) subsequently contacting said intermediate carbon molecular sieve under pyrolysis conditions, including a temperature less than 700° C., with said volatile carbon-containing organic compound in a concentration of from about 1 to 10% by volume in an inert gas.

2. The process of claim 1 wherein said modified carbon molecular sieve is suitable for separating oxygen and nitrogen.

3. The process of claim 1 wherein said pyrolysis conditions include pressures under which the carbon-containing compound is gaseous.

4. The process of claim 3 wherein said volatile carbon-containing compound is a hydrocarbon.

5. The process of claim 4 wherein said hydrocarbon is isobutylene.

6. The method of claim 1 wherein the pyrolysis conditions in step (a) incude a temperature range from 700° to 900° C.

7. The method of claim 1 wherein the pyrolysis conditions in step (b) include a temperature range between 550° to 700° C.

8. A modified carbon molecular sieve made by the process of claim 1.

9. A modified carbon molecular sieve in accordance with claim 8 having almost all of its micropore openings in the range of about 3.8 to 4.3 Å measured at the pore openings.

10. A method of separating at least one component from at least one other component in a feed gas mixture, said method comprising bringing said feed gas mixture into contact with the modified carbon molecular sieve of claim 8 such that said carbon molecular sieve selectively adsorbs at least one component of said feed gas mixture to produce a product gas stream depleted in said adsorbed component.

11. The method of claim 10 wherein oxygen is separated from nitrogen by selective adsorption.

12. The method of claim 10 wherein oxygen is separated from argon.

* * * * *